Patented Dec. 6, 1949

2,490,599

UNITED STATES PATENT OFFICE 2,490,599

STABILIZING EVAPORATED MILK

Herbert E. Otting, Westerville, Ohio, assignor to M & R Dietetic Laboratories, Inc., a corporation of Ohio No Drawing. Application September 11, 1946, Serial No. 696,359

4 Claims. (Cl. 99—55)

1

The present invention relates to improvements in the processing of fluid milk products and more particularly to the stabilization of the milk product against the effects of high temperatures applied during the process of manufacture.

In the processing of fluid milk products to secure products of relatively high total solids content, the fluid milk, skim milk or other fluid milk solids-containing material is frequently subjected to high temperatures at certain stages to effect evaporation or sterilization or for other purposes. In many such operations the milk or milk solids-containing liquid is subjected to temperatures exceeding 150° F., and for sterilizing purposes to temperatures as high as 220 to 270° F. or higher for considerable periods of time before or after the evaporation or concentrating step in which the solids content of the milk products is increased. The high temperatures to which the fluid milk solids-containing material is subjected in such operations causes an increase in viscosity of the final fluid product which in many cases is excessive, and tends to cause coagulation or curd formation in the final product. The increase in viscosity to a certain extent may in some cases be desirable, as, for example, in the manufacture of evaporated (unsweetened) milk. Coagulation and curd formation are in all cases undesirable. However, the extent of increase in viscosity and whether or not curd formation will occur are variable and unpredictable, and appear to depend upon many factors beyond the control of the processor; for example, the season of the year, the feed supplied to the cattle, the nature and analysis of the soil on which the cattle are pastured, and the like.

The present invention is addressed to the control and stabilization of the effects of high heat treatment of milk solids-containing fluids, such as whole milk, skim milk and the like, and more particularly to the control and stabilization of the viscosity and curd-forming or coagulating effects. The invention will be fully understood from the following description, in which various illustrative examples of its use are set forth.

In the manufacture of evaporated milk, for example, four principal steps are involved in which heat is employed, these being the forewarming, the evaporation step proper, homogenization and the final sterilization.

In the forewarming preceding the evaporation, the temperatures ordinarily employed are in the range from 180° to 212° F., although occasionally higher temperatures, up to about 235° F. may be employed by keeping the milk under pressure.

2

Since the milk may be held at the selected temperature for as much as 15 to 20 minutes, at higher temperatures the color and flavor of the milk may be affected, and cooking of milk solids on the heated surfaces may take place. The primary purpose of the forewarming step is to preheat the milk before it enters the evaporator although, as pointed out hereinafter, other purposes may also be served.

The evaporation step is usually conducted at temperatures in the order of 120° to 180° F. under reduced pressure so that boiling occurs. The length of time required for the evaporation step depends upon the initial total solids content of the milk subjected to treatment and the desired total solids content of the final product. In American practice, the minimum total solids standard for evaporated milk is about 26% (25.9%). In other countries in some cases the standard is higher; for example, in England the standard is 31.25% total solids, and for export purposes, a total solids content of 32 to 34% may be desirable. In general the milk is slightly overconcentrated in the evaporator and then adjusted to the standard or slightly thereover by the addition of potable water, fresh milk and the like, prior to sterilization. Occasionally cream must be added to bring the fat content to standard, which is 7.9% in American practice and higher where higher total solids standards prevail. For example, in England the standard for fat content is 9.25%.

Following the evaporation step and any necessary adjustment of the milk to the prevailing standards, the evaporated milk is homogenized. As is usual in such operation, the temperature may be in the order of 120° to 150° F. and the pressure in the order of 2,000 to 3,000 pounds. A typical set of conditions is 3,000 pounds pressure at 135° F.

The evaporated and homogenized milk is then sterilized at temperatures varying from about 220° to about 270° F. The sterilization is usually carried out after the milk has been canned, although in some plants, the evaporated milk is sterilized and subsequently canned in sterile cans. The time required for sterilization will vary according to the temperature employed, in order to secure sterility and for certain other effects as hereinafter pointed out, such as control of viscosity. In general the time at sterilizing temperature may range from 12 to 20 minutes with temperatures from about 220° F. to about 250° F., approximately a similar length of time being required for bringing the milk up to temperature and for cooling the milk after sterilization. With higher temperatures, say in the order of 260° to 270° F., very short times at the sterilizing temperatures are employed.

In conducting the series of steps above referred to, in addition to securing a sterile milk product of the desired total solids content, various other desiderata enter into the process. One is the maintenance, as far as possible, of uniformity of fat distribution in the final product, this being aided by the homogenization step. It is also necessary that a sufficient body or viscosity be secured in the final product to aid in preventing settling out of fat particles. Too high a viscosity is undesirable, since the product should be creamy but not excessively thick. The viscosity, when freshly produced, may be in the range of 75 to 450 seconds at 60° F., as determined by the standard type of viscosimeter used for the purpose, known as the Borden flow meter, and preferably in the neighborhood of 250 to 350 seconds. The body or viscosity of the final product is to a large extent dependent upon the temperatures and times used in the sterilizing operation, higher temperatures and longer times tending to increase the viscosity of the product.

In the commercial conduct of the process, the most serious problem encountered is the maintenance of the stability of the milk while securing sterility and the desired viscosity, body and flavor; that is, the prevention of the formation of curds or flocks completely or, if any appear, which do not dissipate themselves on mere agitation of the final product. This instability arises out of the heat treatment which the milk receives, particularly in the sterilizing step and is an almost constant problem to the commercial operator. The degree of stability or instability of the milk in the processing varies not only with individual cows and herds from which the milk is secured, but also with seasons, types of feed and character of pasturage available. Thus, in processing milk to the American standard, in only part of the early summer in some areas is the milk sufficiently stable to be processed without special treatment, a greater or lesser degree of instability being present during all other parts of the year; and when processing to the higher European standards of total solids content, such as the British, the milk almost invariably requires special treatment to make it stable during processing.

In general, varying additions of certain salts are made to the milk at some time during the processing prior to sterilization, preferably prior to the forewarming step. The permissible salts which may be employed for this purpose are certain "naturally occurring" salts, such as sodium bicarbonate, sodium citrate and disodium phosphate. Since the precise degree of instability of a batch of milk being processed, which may be as much as 60,000 to 100,000 pounds, is unpredictable, it is the practice commercially to make a pilot test on small portions from each batch of milk, to which varying additions of one of the permissible salts are made and the resulting batches put through a pilot sterilizer which duplicates the performance of the large scale sterilizer used by the particular plant. From the behavior of these pilot samples, the proportion of added salt, if any, required to secure stability in the processing is determined. Thus, referring to disodium phosphate as the salt used (in the form of the heptahydrate), it may be found that in the summer months, during the early period of outside pasturage in the midwest section, from 0 to 5 ounces of the salt may be required per thousand pounds of evaporated milk, whereas in the winter the requirement may rise to 10 to 15 ounces per thousand pounds concentrated milk, or higher. This has reference to milk evaporated to the American standard of 25.9% total solids or slightly higher. Higher proportions of added salt are needed if a higher total solids content is desired; for example, milk stable without salt addition for concentration to about 26% total solids may require as much as 48 to 50 ounces per thousand pounds if it is to be brought to a total solids content of 32 to 34%.

There are certain interrelations between the steps in the process which introduce difficulties into its proper conduct. Other conditions being the same, the proportion of added salt used with a given batch of milk must be held within fairly close range, since under-correction or over-correction will result in curd formation or graininess, apart from undesirable effects on viscosity. The stability in the sterilizing step may be increased by the use of higher temperatures in the fore warming step, but here again the temperature or the extent to which the forewarming may be carried must be kept within close upper limits or a sharp break may occur in the sterilizing operation with curd formation or graininess in the final product. Furthermore, the extent of the correction which may be secured in the forewarmer by the use of high temperatures or long times of heating is limited because of the injury to taste, flavor and color of the milk which may occur there.

In carrying out the present invention, I have found that I may control the viscosity and stabilize the fluid milk product against the heat treatment to which it is subjected in the concentrating process and particularly in the sterilizing step, by the use of mineral modified milk or milk solids resulting from the treatment of fluid milk, whole or skim, with base exchange materials of the mineral or zeolitic type, including activiated silica gel. Such mineral modified milk or milk solids may be prepared as described, for example, in the Lyman Patent No. 1,954,769, granted April 10, 1934 and in the patent to myself, No. 2,045,097, granted June 23, 1936. In such treatment, substantial reduction is effected of both the calcium and the phosphorus content of the non-fat milk solids with some reduction in the ratio of calcium to phosphorus, these changes resulting in a reduction of the curd tension of the milk.

In such treatment of whole milk or skim milk, the calcium to phosphorus ratio of the non-fat milk solids, which in normal whole or skim milk is in the order of 1.175 to 1.240 may be reduced to 1.155 or lower, owing to the fact that the reduction in calcium is proportionately somewhat greater than the reduction in phosphorus. In such processes, by increasing the relative proportions of the base exchange materials employed, such as glauconite, synthetic or natural zeolite or the like, and thereby effecting a proportional removal of both calcium and phosphorus, I have been able to secure in the non-fat total solids of the treated product a calcium to phosphorus ratio as low as about 0.815, corresponding to a ratio of CaO to $P_2O_5$ of about 0.500. It is preferred that the calcium:phosphorus ratio be in the range from about 0.815 to 1.000. These products may suitably be designated as base exchange treated, to differentiate them from ion exchange treated milk products, which are produced by subjecting the fluid milk to treatment with selective ion exchange materials whereby a higher proportional removal of calcium with relation to the removal of phosphorus is effected, for example, as described in the copending application of H. E. Otting, L. H. Chrysler and E. F. Almy, Serial No. 696,360, filed September 11, 1946, now Patent No. 2,473,493, patented June 14, 1949.

In carrying out the present invention, the base exchange modified milk solids resulting from the treatment as aforesaid are mixed with the milk (whole or skim) to be concentrated in proportions to provide from about 8% to about 60% and preferably from about 20% to about 50% of the total solids in the final evaporated product, the addition being made to the milk being subjected to the evaporation processing steps at some time prior to the final high temperature treatment or sterilization. The base exchange modified milk solids may be added either in the form of the treated fluid milk (whole or skim); or the treated milk may be evaporated to a desired total solids content suitably approximating the milk solids content desired in the final product, say 25.9% to 34% or to some intermediate concentration and added as such; or the treated milk may be dried to solids, suitably by evaporation followed by spray drying and the resulting dry solids added. The addition of the treated milk solids may be made at any suitable point in the process; for example, in preparing evaporated milk, at the forewarmer during or prior to the forewarming operation; or to the evaporated milk between the evaporator and the homogenizer. It may also be added between the homogenizer and the sterilizer but as is readily apparent, it is preferable to add it prior to the homogenizer, since the latter aids in mixing the added treated milk solids or milk solids containing material with the main body of milk or milk product undergoing processing.

When added prior to the concentrating or evaporating step, the base exchange treated milk solids may be added either in the form of the treated milk fluid, or the evaporated treated milk fluid or as the dried solids therefrom, it being found preferable to make the addition at or prior to the forewarmer. When added after the evaporating or concentrating step, the treated milk solids are added in the form of the evaporated treated milk fluid of a concentration approximating that desired in the final product or a higher concentration, or as the dried solids therefrom. The customary adjustment of the total solids and fat content of the evaporated product is then made before the final sterilizing step.

The proportion of the base exchange treated milk solids necessary for stabilization varies in the range from about 8% to about 60%, based on total milk solids content of the mixture, lower proportions being sufficient when the final product is to meet the American standard of 25.9% total solids and higher proportions being required when the higher European standards in the order of 32 to 34% total solids are to be met in the final product.

The base exchange treated milk solids may, if desired, be substantially fat free and may be secured by the treatment of skim milk. In such case, the fat content of the final product may be adjusted prior to the sterilizing step, as is the customary practice.

As an example of the present invention, a base exchange treated skim milk was prepared, using a zeolitic base exchange material known as crystallite, which had previously been prepared for treatment by a suitable revivifying process, such as that described in the prior patent of myself and others, No. 2,102,642. Both the calcium and phosphorus contents of the milk were substantially reduced, the final calcium to phosphorus ratio being in the order of 1.154. This treated milk was then converted to a dry powder by the usual evaporation and spray drying procedure.

In preparation of an evaporated whole milk of 30% total solids content, this treated base exchange powder was added to the milk after the evaporation step and prior to sterilization. This whole milk, on being tested alone, required the addition of about six ounces of disodium phosphate per thousand pounds of evaporated milk to effect its stabilization. With the addition of the base exchange treated powder to provide 8% and 10% of the total milk solids in the product, and with no salt addition, satisfactory stabilized products without curd and of good body were obtained.

In another example, in the preparation of an evaporated milk of about 26% total solids, base exchange treated solids were added in the form of a base exchange treated evaporated skim milk containing 18% total solids, prepared by contacting evaporated skim milk with crystallite regenerated as above described. This was incorporated in milk being subjected to the evaporating process prior to the evaporation stage in proportions to provide 25% and 50% of the treated milk solids in the total solids in the product. The sterilization was conducted at 240° F. for 19 minutes. In both cases the products were stable against curd formation, the body of the final product being somewhat thinner with the higher proportion of the base exchange treated milk. The untreated milk used in this evaporation process coagulated badly when subjected to the evaporating and sterilizing procedure without the addition of the base exchange treated milk solids.

In connection with the use of such base exchange treated milk solids as are hereinbefore described, it has been found that when the proportion of the treated milk solids, basis total solids, in the milk being processed exceeds about 60%, a reversion occurs and irreversible curd formation again becomes manifest as a result of the heat treatment.

In the preceding specification the calcium to phosphorus ratio of the base exchange treated material in milk solids has been referred to as an indication of the effects resulting from the treatment with the exchange material, but it is not intended thereby that it is the sole result or the only one effective in securing the stabilizing effect described herein. It appears that there are other effects resulting from this treatment and to which the stabilization effect hereinbefore described may be due, at least in part. That this is the case is indicated, to some extent at least, by the fact that the calcium to phosphorus ratio in the solids of the final stable product is frequently within the range normal in untreated milk which is unstable when subjected to the heat treatment involved in the processes described above.

Although the present invention has been described in connection with various specific examples illustrating its use, it is not intended that the details of these examples shall be regarded as limitations upon the scope of the claims, except insofar as included in the accompanying claims.

I claim:

1 The method of preparing concentrated fluid milk products and of controlling the viscosity and preventing curd formation therein during heating which comprises the steps of evaporating a milk solids-containing liquid under treatment to secure in it approximately the desired concentration of total milk solids of at least about 26%, subsequently subjecting the evaporated milk product to sterilizing temperatures in the range of from about 220° to about 270° F., and incorporating into the milk product under treatment prior to the said sterilization step, from 8% to 60% (basis total solids) of base exchange treated milk solids having a calcium to phosphorus ratio of from 0.815 to 1.155.

2. The method of preparing concentrated fluid milk products and of controlling the viscosity and preventing curd formation therein during heating which comprises the steps of forewarming a milk solids-containing liquid under treatment, subjecting the fluid milk product to evaporation to secure in it approximately the desired concentration of total milk solids of at least about 26%, subsequently subjecting the evaporated milk product to sterilizing temperatures in the range of from about 220° to about 270° F., and incorporating into the milk product under treatment prior to the said sterilization step, from 8% to 60% (basis total solids) of base exchange treated milk solids having a calcium to phosphorus ratio of from 0.815 to 1.155.

3. The process in accordance with claim 2 wherein the treated milk solids are added to the fluid milk under treatment to be present during the forewarming step.

4. The method of preparing concentrated fluid milk products and of controlling the viscosity and preventing curd formation therein during heating which comprises the steps of evaporating a milk solids-containing liquid under treatment to secure in it approximately the desired concentration of total milk solids of about 26%, subsequently subjecting the evaporated milk product to sterilizing temperatures in the range of from about 220° to about 270° F., and incorporating into the milk product under treatment prior to the said sterilization step, from 8% to 60% (basis total solids) of base exchange treated milk solids having a calcium to phosphorus ratio of from 0.815 to 1.000.

HERBERT E. OTTING.

REFERENCES CITED

The following references are of record in the file of this patent:

UNITED STATES PATENTS

| Number | Name | Date |
|---|---|---|
| 1,511,808 | Grindrod | Oct. 14, 1924 |
| 2,045,097 | Otting | June 23, 1936 |
| 2,072,903 | Otting et al. | Mar. 9, 1937 |
| 2,102,642 | Otting et al. | Dec 21, 1937 |
| 2,233,178 | Otting | Feb. 25, 1941 |
| 2,346,844 | Hull | Apr. 18, 1944 |

FOREIGN PATENTS

| Number | Country | Date |
|---|---|---|
| 542,846 | Great Britain | Jan. 29, 1942 |

OTHER REFERENCES

"Condensed Milk and Milk Powder," by O. F. Hunziker, published by the author, La Grange, Illinois, 1926, 4th edition, pages 198 to 212.

"Readjustment of Salts in Milk by Base Exchange Treatment," published in Ind. and Eng. Chemistry, Nov. 1933, pp. 1297–1298.

Journal of Dairy Science, volume XXX; No. 10, October 1947, pages 737, 738, 739, 740 and 741.